(12) United States Patent
Lin

(10) Patent No.: US 8,354,632 B2
(45) Date of Patent: Jan. 15, 2013

(54) OPTOELECTRONIC TRANSMISSION SYSTEM WITH OPTICAL FIBERS FOR TRANSMITTING SIGNALS FROM TWO DIFFERENT DIRECTIONS

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 346 days.

(21) Appl. No.: 12/843,800

(22) Filed: Jul. 26, 2010

(65) Prior Publication Data

US 2011/0303830 A1  Dec. 15, 2011

(30) Foreign Application Priority Data

Jun. 14, 2010  (TW) .............................. 99119217 A

(51) Int. Cl.
*G01J 1/04* (2006.01)
(52) U.S. Cl. .............................. 250/227.14; 250/227.21
(58) Field of Classification Search ............. 250/227.11, 250/227.14, 227.21, 227.25, 216, 903; 385/24, 385/12, 14, 25, 31, 39, 52; 73/293, 302
See application file for complete search history.

(56) References Cited

U.S. PATENT DOCUMENTS 5,054,319 A * 10/1991 Fling ............................. 73/319

* cited by examiner

*Primary Examiner* — Que T Le
(74) *Attorney, Agent, or Firm* — Altis Law Group, Inc.

(57) ABSTRACT

An optoelectronic transmission system includes a light guide module, an optical signal source, an optical fiber, and a light detector. The light guide module includes a light guide body, and a lens formed on the light guide body. The optical signal source emits output optical signals towards the light guide body. The light guide body reflects and directs the output optical signals towards the lens. The optical fiber includes a first end and an opposing second end. The optical fiber transmits the output optical signals from the first end to the second end, and transmits input optical signals from the second end to the first end. The light guide body transmits the input optical signal therethrough. The light detector is positioned at an opposite side of the light guide module to the optical fiber. The light detector receives and converts the input optical signals into electrical signals.

8 Claims, 3 Drawing Sheets

OPTOELECTRONIC TRANSMISSION SYSTEM WITH OPTICAL FIBERS FOR TRANSMITTING SIGNALS FROM TWO DIFFERENT DIRECTIONS

BACKGROUND

1. Technical Field

The present disclosure relates to optoelectronic transmission systems.

2. Description of Related Art

An optoelectronic transmission system typically includes an optical signal source, a light detector, a first optical fiber for sending output optical signals emitted from the optical signal source and a second optical fiber for receiving and directing input optical signals to the light detector. The light detector converts the input optical signals into electrical signals. However, when the optoelectronic transmission system is sending optical signals, the first optical fiber is used while the second optical fiber is idle and visa versa. A utilization ratio of the optoelectronic transmission system is low and cost of the optoelectronic transmission system increases.

Therefore, an optoelectronic transmission system, which can overcome the above-mentioned problems, is needed.

DETAILED DESCRIPTION

Figure 1:
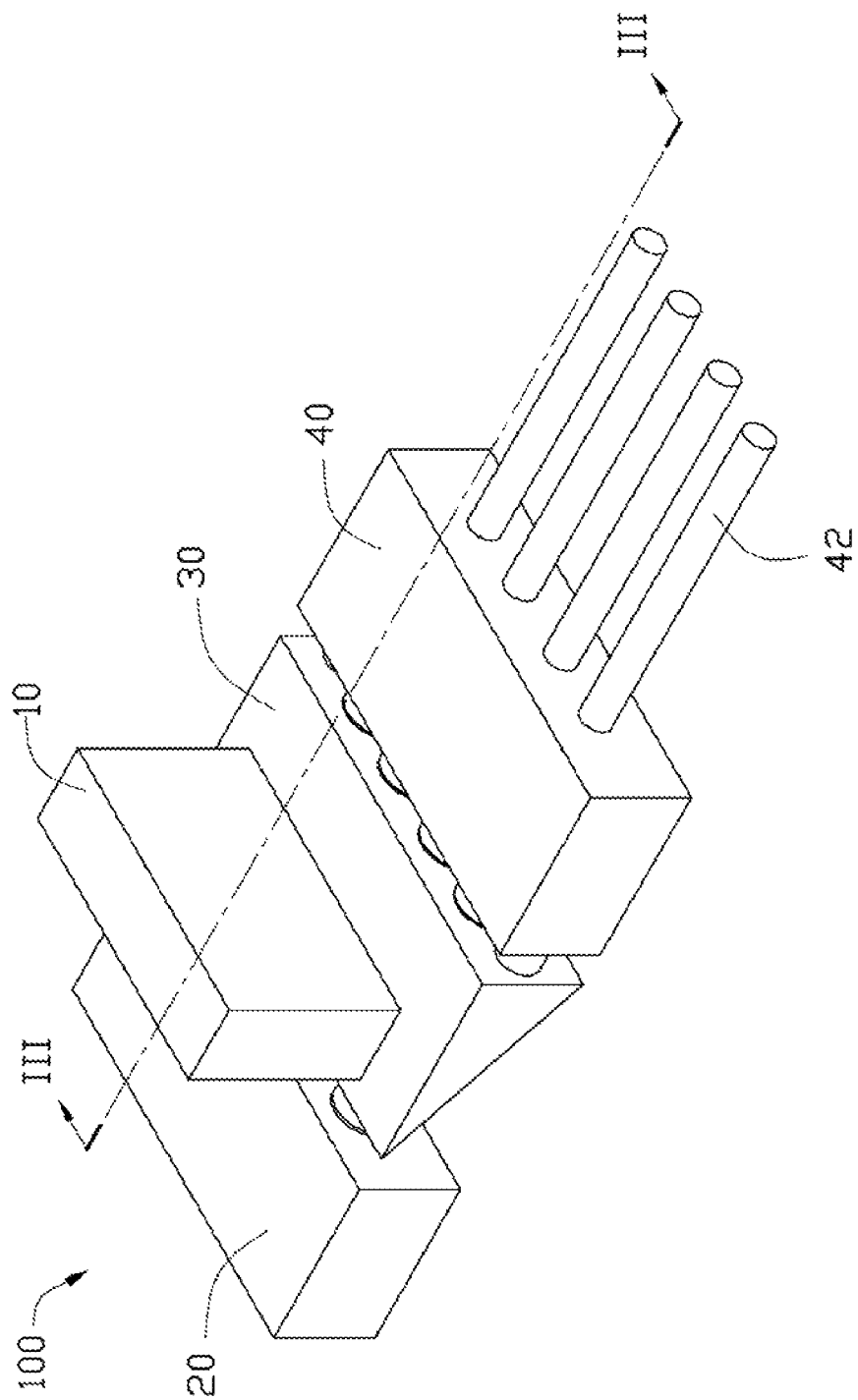
FIG. 1 is an isometric and schematic view of an optoelectronic transmission system, according to an exemplary embodiment.
Figure 2:
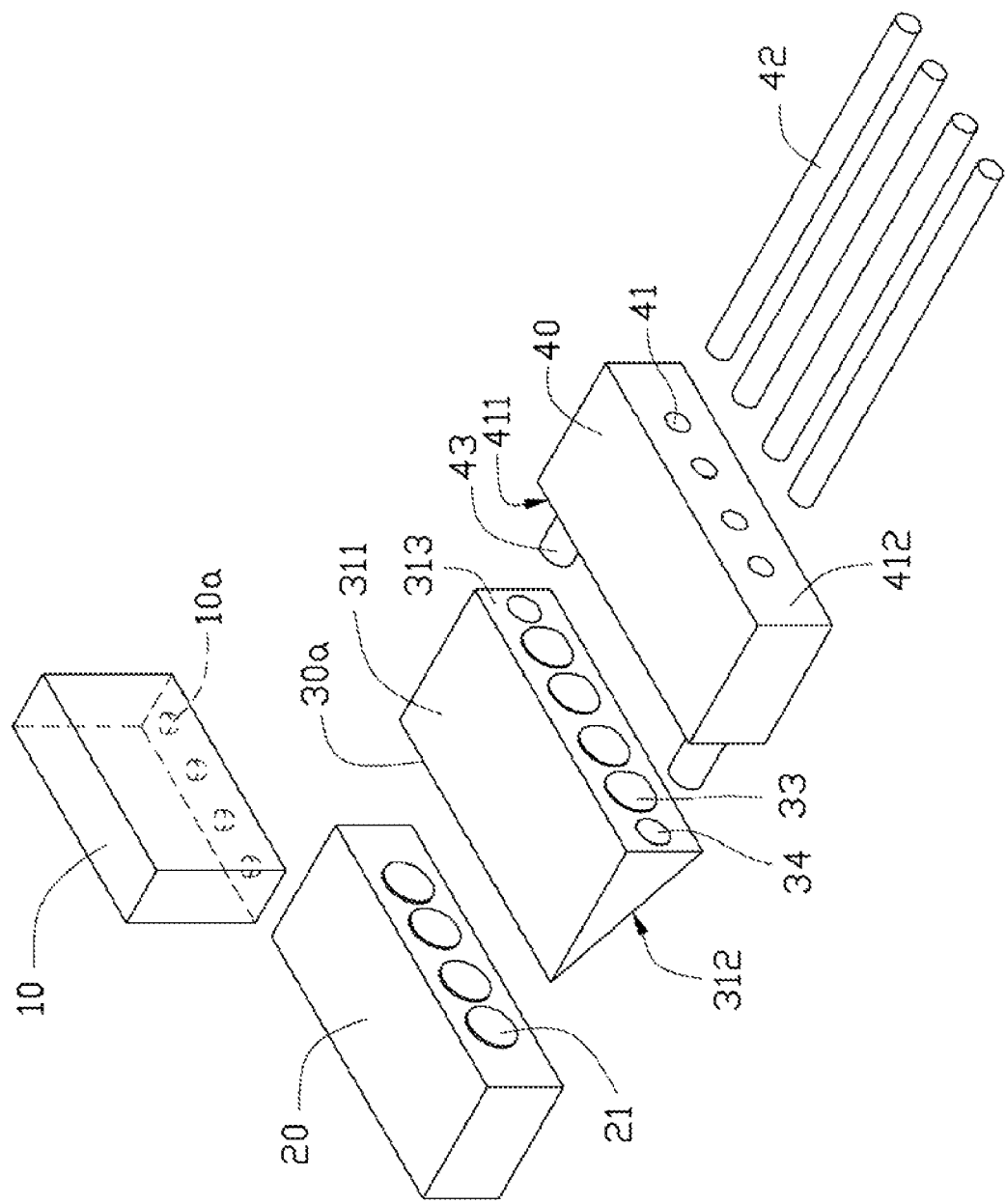
FIG. 2 is an exploded view of the optoelectronic transmission system of FIG. 1.
Figure 3:
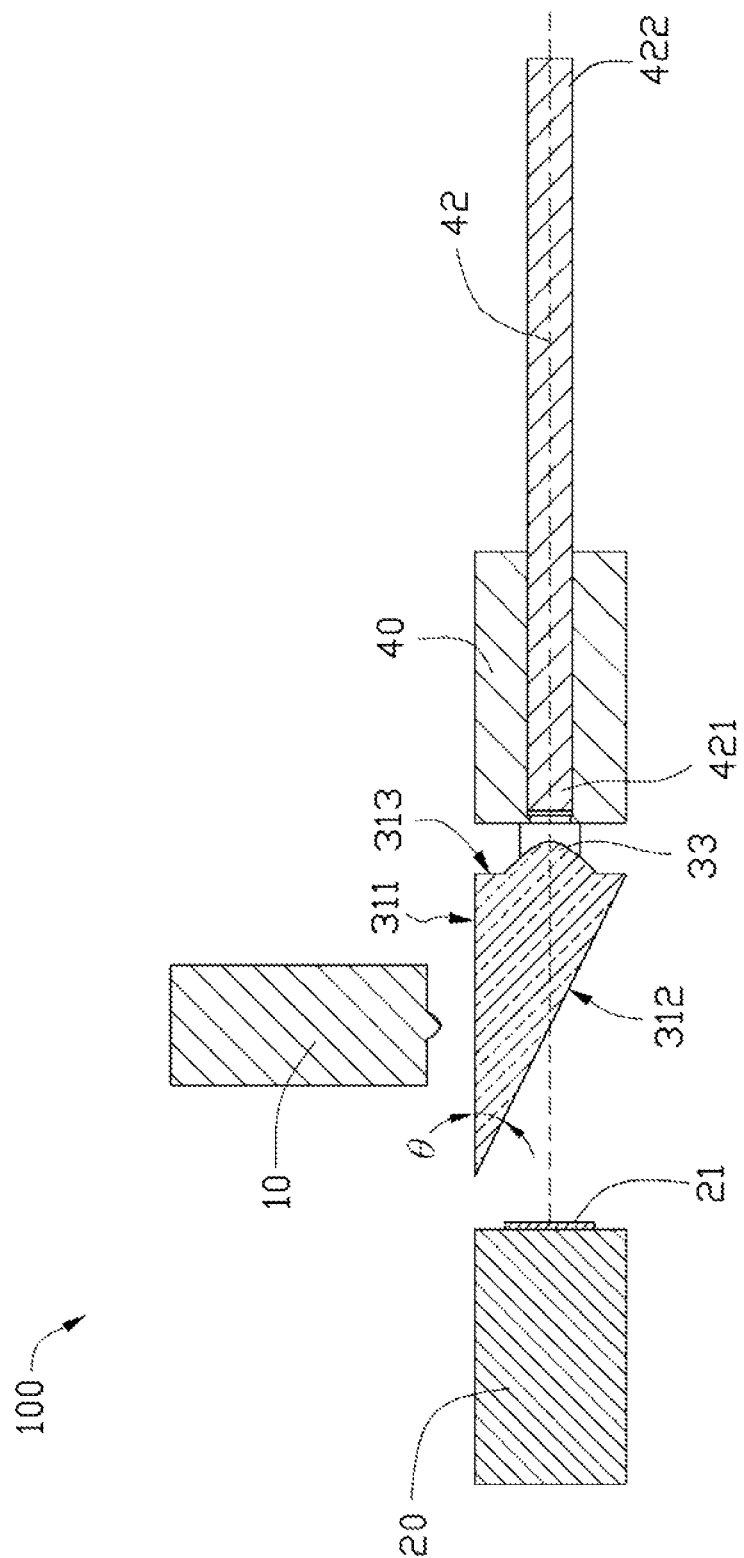
FIG. 3 is a sectional view taken along line of the optoelectronic transmission system of FIG. 1.

Referring to FIGS. 1-3, an optoelectronic transmission system 100, according to an exemplary embodiment, includes an optical signal source module 10, a light detector module 20, a light guide module 30, a connector body 40, and a plurality of optical fibers 42.

The light guide module 30 includes a light guide body 30a and a plurality of lenses 33. The light guide body 30a is substantially a triangular prism and includes a first surface 311, a second surface 312 and a third surface 313. The first surface 311, the second surface 312 and the third surface 313 are connected to each other end-to-end. The first surface 311 is substantially perpendicular to the third surface 313.

The optical signal source module 10, such as a laser source module, is positioned above the light guide module 30 and faces the first surface 311. The optical signal source module 10 includes a plurality of optical signal sources 10a. In this embodiment, light (output optical signals) emitted from the optical signal source 10a perpendicularly enters the first surface 311. The light is then reflected by the second surface 312 towards the third surface 313 and finally is output from the third surface 313. The lenses 33, which are aspherical and convex, are formed on the third surface 313 in a line. Light reflected by the second surface 312 is converged by the lenses 33. In this embodiment, the lenses 33 are integrally formed with the light guide body 30a. Material of the light guide module 30 may be plastic or glass and may be manufactured by an injection molding process. In alternative embodiments, the light emitted from the optical signal source module 10 may enter the first surface 311 with other angles other than 90 degrees.

An included angle θ between the first surface 311 and the second surface 312 may be optimized to allow the light emitted from the optical signal source 10a to undergo a total-internal reflection on the second surface 312 towards the third surface 313 and the lenses 33. That is, the second surface 312 is configured for totally internally reflecting and directing the output optical signals towards the lens 33.

The light guide module 30 further includes two positioning holes 34 defined in opposite ends of the third surface 313. The lenses 33 are located between the two positioning holes 34.

The connector body 40 is coupled to the light guide module 30. The connector body 40 is substantially cuboid and includes a first side surface 411 and a second side surface 412 at opposite sides of the connector body 40. The first side surface 411 faces the lenses 33. A plurality of through holes 41 are defined from the first side surface 411 to the second side surface 412. The optical fibers 42 are received in the respective through holes 41 and optically coupled to the respective lenses 33. The optical fiber 42 includes a first end 421 and an opposing second end 422. The first end 421 is received in the through hole 41 near the first side surface 411. The optical fiber 42 is configured for transmitting the output optical signals from the first end 421 to the second end 422, and transmitting input optical signals from the second end 422 to the first end 421. The light guide body 30a is configured for transmitting the input optical signal therethrough. A position of an end surface of the first end 421 is located at a focal point of the corresponding lens 33. Therefore, loss of optical signals can be minimized.

Two positioning posts 43 protrude from the first side surface 411 and are respectively inserted into the two positioning holes 34. Therefore, alignment between the lenses 33 and the optical fibers 42 can be maintained.

The light detector module 20 is positioned at an opposite side of the light guide module 30 to the optical fiber 42. The light detector module 20 includes a plurality of light detectors 21 facing the second surface 312. The light detector 21 is also positioned at the opposite side of the light guide module 30 to the optical fiber 42. The light detector 21 is configured for receiving and converting the input optical signals from the light guide body 30a into electrical signals.

When sending output optical signals, the optical signal source 10 emits light (the output optical signals) towards the light guide module 30. The light enters into the light guide module 30 through the first surface 311 and then is reflected by the second surface 312 towards the lenses 33 and is finally converged by the lenses 33 onto the optical fibers 42. The optical fibers 42 output the received light.

When receiving input optical signals, the input optical signals (light) are transmitted through the optical fibers 42 from the second end 422 towards the light detector module 20. Then, the input optical signals pass through the light guide module 30 and exit from the second surface 312 and are received and converted by the light detectors 21 into electrical signals.

Since the optical fibers 42 can be used as sending and receiving optical signals, a utilization ratio of the optoelectronic transmission system 100 increases and cost thereof reduces.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optoelectronic transmission system, comprising:
a light guide module comprising a light guide body, and a lens formed on the light guide body;
an optical signal source configured for emitting output optical signals towards the light guide body, the light guide body configured for reflecting and directing the output optical signals towards the lens;
an optical fiber comprising a first end and an opposing second end, the optical fiber optically coupled to the lens, the optical fiber configured for transmitting the output optical signals from the first end to the second end, and transmitting input optical signals from the second end to the first end, the light guide body configured for transmitting the input optical signals therethrough; and
a light detector positioned at an opposite side of the light guide module to the optical fiber, the light detector configured for receiving and converting the input optical signals from the light guide body into electrical signals.

2. The optoelectronic transmission system of claim 1, wherein the light guide body is substantially a triangular prism and comprises a first surface, a second surface and a third surface connected to each other end-to-end, the first surface substantially perpendicular to the third surface.

3. The optoelectronic transmission system of claim 2, wherein the optical signal source faces the first surface.

4. The optoelectronic transmission system of claim 3, wherein the lens is formed on the third surface.

5. The optoelectronic transmission system of claim 4, wherein the second surface is configured for totally internally reflecting and directing the output optical signals towards the lens.

6. The optoelectronic transmission system of claim 4, wherein the light guide module further comprises two positioning holes defined in opposite ends of the third surface, the lens being located between the two positioning holes.

7. The optoelectronic transmission system of claim 6, further comprising a connector body, two positioning posts and a through hole, the connector body comprising a first side surface and a second side surface at opposite sides thereof, the first side surface facing the lens, the through hole defined from the first side surface to the second side surface and receiving the optical fiber, the two positioning posts protruding from the first side surface and inserted into the two positioning holes respectively.

8. An optoelectronic transmission system, comprising:
a triangular prism including a light guide body comprising a first surface, a second surface bordering the first surface, and a third surface bordering the first and second surfaces;
a lens formed on the third surface;
an optical signal source configured for emitting output optical signals to the first surface, the optical signal source being oriented relative to the first surface in a manner so as to enable the second surface to totally internally reflect and direct the output optical signals towards the lens;
an optical fiber comprising a first end and an opposing second end, the optical fiber optically coupled to the lens, the optical fiber configured for transmitting the output optical signals from the first end to the second end, and transmitting input optical signals from the second end to the first end, the light guide body configured for allowing the input optical signals to pass therethrough and exit from the second surface; and
a light detector facing the second surface and configured for receiving and converting the input optical signals from the light guide body into electrical signals.

* * * * *